April 23, 1963
P. M. COOK ET AL
3,086,242
PROCESS AND APPARATUS FOR PRODUCING MATERIALS
HAVING PLASTIC MEMORY
Filed July 15, 1960
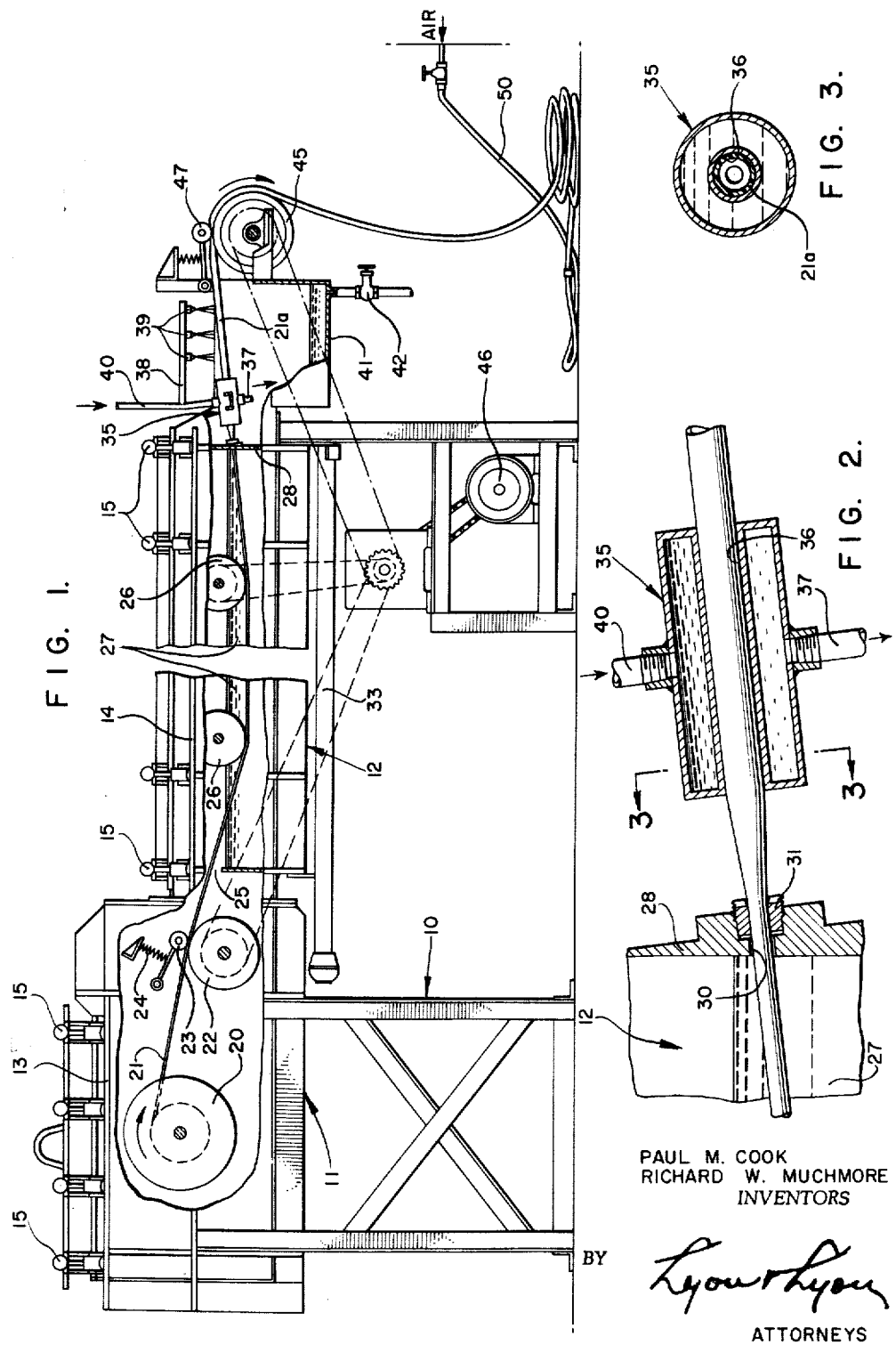
PAUL M. COOK
RICHARD W. MUCHMORE
INVENTORS
BY *Lyon & Lyon*
ATTORNEYS United States Patent Office 3,086,242
Patented Apr. 23, 1963

3,086,242
PROCESS AND APPARATUS FOR PRODUCING MATERIALS HAVING PLASTIC MEMORY
Paul M. Cook, Atherton, and Richard W. Muchmore, Redwood City, Calif., assignors to Raychem Corporation, Redwood City, Calif., a corporation of California
Filed July 15, 1960, Ser. No. 43,230
13 Claims. (Cl. 18—1)

This invention relates to the treatment of polymeric materials and has particular reference to the treatment of plastic articles to impart plastic memory characteristics thereto so as to provide heat-unstable products which retain their form and dimensions under low or normal temperature conditions, but which upon heating to a critical temperature change their form and return to their pre-treatment form and dimensions.

The plastic materials with which the invention is concerned comprise polymers selected from the group consisting of (1) crystalline polymers which exhibit elastomeric properties either at or above their crystalline melting range, i.e., thermoplastic polymers and co-polymers such as polytetrafluoroethylene, high molecular weight polypropylene and polyethylene, etc., and (2) crystalline polymers and co-polymers, including polyolefins such as polyethylene and polypropylene, vinyls such as polyvinyl chloride and polyvinyl acetate and co-polymers thereof, polyamides, etc., which have been cross-linked by chemical methods or by irradiation as by high energy electrons or ionizing radiation.

This invention comprehends within its scope the application of the discovery that extruded crystalline polymers and extruded cross-linked crystalline polymeric materials, when heated to a temperature above the crystalline melting point or range, behave as true elastomers, and, even more important, they exhibit under cooling through the crystalline melting range an extension in size even though both the tensile strength increases and the specific volume decreases. This extension in size can be of the order of 400 to 800 percent, which is much greater than can be accomplished by simply expanding in the molten (amorphous) state.

The specific details of this invention can best be illustrated by citing as an example the synthesis of heat shrinkable tubing from a crystalline cross-linked polymer. The tubing is first extruded using any conventional type extruder. In extrusion processes, it is known that there is a degree of orientation (molecular displacement) which results from the shearing forces, pull, etc., during extrusion. Said tubing, when heated above the crystalline melting range, will exhibit a retraction due to the release of the "frozen-in" strains which were introduced in the material by the extrusion process. The degree of shrinkage will depend, of course, upon the degree of orientation. When said tubing is subjected to a sufficient irradiation dose (a minimum of $2 \times 10^6$ rads) or chemically cross-linked to a minimum state equivalent to that resulting from a minimum irradiation dose of $2 \times 10^6$ rads, the "frozen-in" strains (orientation) are locked into the structure due to the formation of primary valence bonds (cross-links). When said tubing is then heated above the crystalline melting range, much less retraction occurs, depending upon the degree of cross-linking. Thus, the material remains oriented. While the application of sufficient pressure inside the tubing in its elastic state will expand the tubing, it is possible to apply pressure and not expand the tubing. Subsequently, controlled cooling of the tubing through the crystalline melting range while still pressurized causes the tubing to expand. It is hypothesized that this expansion is due to the crystallization of the oriented polymer which causes the crystals to assume a preferred orientation. Thus, it is envisioned that as the temperature is lowered through the crystalline melting range, the crystalline structure literally "snaps into place," this being a preferred orientation due to the beforementioned original "frozen-in" strain. It is believed that the amount of orientation necessary to produce the extension effect is a function of several variables such as type of polymer, molecular weight, amount of irradiation, temperature, etc. It is, therefore, difficult to define and measure the amount of orientation (molecular displacement) necessary to produce the extension phenomenon. In any event, the orientation produced by conventional extrusion techniques is adequate for the purposes of this invention.

As was previously stated certain crystalline polymers will also exhibit this phenomenon if at some temperature at or above their crystalline melting range they behave as elastomeric materials for a period of time even though this be of short duration. It is believed that essentially non-polar high molecular weight polymers which possess appreciable strengths at elevated temperatures, and other polymers which exhibit strength at high temperatures due to stronger bonding, hydrogen bonding, dipole-dipole attraction, etc., behave similarly to cross-linked crystalline polymers. In general, then, any crystalline polymer which has sufficient strength and is elastomeric at elevated temperature will exhibit the beforementioned extension phenomenon. Thus, for example, we have found that a heat shrinkable tubing can be made from extruded polytetrafluoroethylene. In this instance, heating does not release the "frozen-in" strains because of the melt strength of the polymer. Therefore, in cooling polytetrafluoroethylene tubing through the crystalline melting range of the polymer in a pressurized system the same phenomenon of extension occurs. Again, it is believed that this extension is due to the crystallization of the extruded polymer which causes the crystals to assume a preferred orientation.

A primary object of the present invention is to provide a novel process for producing articles of crystalline or cross-linked crystalline polymeric materials, such articles having plastic memory characteristics.

Another object of this invention is to provide a continuous process for the production of articles of crystalline or cross-linked crystalline polymeric materials, said articles being in the form of heat-shrinkable tubing.

It is, of course, also possible to employ the beforementioned process to produce heat shrinkable articles in forms other than tubing. Heat shrinkable caps, splice closures, etc., are among those structures which can be made by this invention, and it is an object of this invention to provide a process for the production thereof.

A further object of the present invention is to provide a process for the production of radially heat-unstable but axially heat-stable tubes of polymeric material.

Still another object of this invention is to provide novel apparatus for carrying out the process of the present invention.

Other objects and advantages of this invention will become apparent from the following detailed description taken in connection with the accompanying drawings, wherein are set forth by way of illustration and example certain embodiments of this invention.

In the drawings:

FIGURE 1 is a side elevation, partly in section, of an apparatus used in carrying out the invention.

FIGURE 2 is an enlarged vertical longitudinal sectional view of the tank seal and cooling die.

FIGURE 3 is a sectional view taken substantially on the line 3—3 of FIGURE 2.

The present invention, as applied to the production of heat-unstable tubing, comprises the steps of: (1) heating a tube of crystalline or cross-linked crystalline polymeric material to an elevated temperature equal to or above its crystalline melting temperature or range so as to melt the crystals in the material; (2) while the tube is at said temperature, imparting controlled radial stresses to the tube wall, as by a pressure differential between the inside and outside of the tube, the stresses being insufficient to bring about any appreciable change of dimensions of the tube at a temperature in excess of the crystalline melting temperature or range, but being sufficient to cause an appreciable and predetermined change of dimensions when the tube is cooled through the crystalline melting range of the polymers; (3) then cooling the tube to a temperature below crystalline melting temperature or range, while maintaining the applied stresses so as to set the tube at its changed and predetermined dimensions.

Referring now to the drawings, the apparatus shown therein is designed to carry out the process of the present invention as applied to the treatment of irradiated polyethylene tubing to continuously produce a heat-shrinkable polyethylene tubing. As shown, the apparatus includes a framework 10 on which is supported a pair of pressure vessels 11 and 12, each provided with removable covers 13, 14 held in place by clamps 15.

The vessel 11 houses a supply reel 20 of tubing 21, a drive roll 22 and an idler roll 23, the roll 23 being spring loaded by means of the spring 24. An opening 25 is provided between the vessels 11 and 12, the vessel 12 containing a pair or more of driven rolls 26, the rolls being immersed in an oil or other liquid bath 27. The rear end wall 28 of the vessel 12 is provided with an aperture 30 in which is secured an apertured plug 31. A burner 33 is provided for maintaining the temperature of the oil bath at the desired elevated condition.

A jacketed cooling ring or die 35 is mounted adjacent to the end wall 28 in axial alignment with the aperture 30. The interior surface 36 of the ring 35 is substantially equal in diameter to the desired final diameter of the expanded tubing. A water or other coolant line 40 leads to the cooling ring and has a connecting line 38 leading to spray nozzles 39. A coolant outlet line 37 leads from the underside of the cooling ring 35 to a sump 41 provided with a drain valve 42.

A drive roll 45, driven from the motor 46, is mounted at the rear end of the apparatus. The rolls 22 and 26 are also driven from the motor 46 and at the same or different peripheral speed as the roll 45. Cooperating with the drive roll is a spring loaded idler roll 47.

In the use of the apparatus, the end of the tubing 21 to be expanded is first pulled by hand through the apparatus and connected to the air supply line 50. The oil bath 27 is then heated to the desired temperature, the desired air pressure is introduced through the line 50, the motor 46 is started and the water to the ring 35 and nozzles 39 is started. The end of the tubing on the reel 20 is open so that the pressure in the vessels 11 and 12 is the same as the pressure inside the length of the tubing that is within the vessels.

It will thus be seen that the tubing is fed continuously through the apparatus, first between the rolls 22 and 23, then into the vessel 12 and therein held under the surface of the oil bath by means of the rolls 26, wherein the tubing is brought to a temperature above the crystalline melting temperature, then out the aperture 30. At this point, because of the cooling effect of the ambient air and the cooling ring 35, and the pressure differential between the relatively high pressure air inside the tubing and the atmospheric pressure outside the tubing, the tubing begins to expand. The expansion continues to the final predetermined diameter wherein the expanded tubing 21a contacts the surface 36 of the ring 35. The degree of expansion is controlled by varying the pressure differential, not by varying the size of the ring 35. That is, the pressure differential is just sufficient to bring the tubing into contact with the ring surface 36 and at that point the tubing has been cooled to below the crystalline melting temperature so that the tubing diameter is in the set condition. It is, of course, understood that a different size ring 35 must be used for each final diameter of tubing processed.

It should be pointed out that with the process of the present invention, all portions of the tubing move through the apparatus at substantially the same longitudinal speed, including the expanded portions thereof. Thus, only the radial dimensions of the tubing are changed, the length of the tubing remaining substantially unchanged. Accordingly, when any selected length of the finished tubing is used as a heat-shrinkable tube, the application of heat to or above the crystalline melting temperature will cause the tube to tend to shrink back to its original diameter and wall thickness, but there will be substantially no axial shrink-back.

It is within the scope of the present invention to carry out the process in open vessels, i.e., such as with the covers 13 and 14 removed. In such case, the end of the tubing on the reel 20 would be closed and more critical pressure control is required, but it will be understood that by proper control of the pressure inside the tubing, the process will proceed in the same manner as described above. That is, the tubing will expand when being cooled down through the crystalline melting temperature outside the bath due to the beforementioned crystallization-orientation effect.

The following specific examples further illustrate the process of the present invention, but it is to be understood that the invention is not to be limited to the details thereof.

Example I

The polyethylene tubing utilized was a yellow modified polyethylene extruded as a tube and irradiated to a dose of 40 megarads. The weight composition of the extruded material was 55% Du Pont polyethylene (mol. wgt. ave. 20,000), 15% of "Chlorowax" manufactured by Diamond Alkali Co., 28% antimony trioxide, 1% 4,4'-thio-bis-(6-tert-butyl-m-cresol) antioxidant and 1% benzedine yellow (Imperial Pigment Corporation, No. X–2600). Four hundred and twenty-six feet of this tubing was processed as described above in connection with the apparatus shown in the drawings. The initial tubing had an inside diameter of 0.375–0.385 inch and a wall thickness of 0.025–0.028 inch. The bath temperature was 280° F., the applied pressure was 1¾ p.s.i.g., and the lineal speed of travel of the tubing was 18 ft. per minute. The inside diameter of the aperture plug 31 was 0.500 inch and the diameter of the surface 36 was 0.620 inch. The expanded inside diameter of the tubing varied from 0.485 to 0.510 inch and the wall thickness from 0.019 to 0.022 inch. Of the 462 feet on the reel, 410 feet of the finished tubing were good material within these limits, and 52 feet varied above or below the given dimensions due to starting and stopping the apparatus. Samples of the finished product were heated to 280° F., exhibiting less than 7.57% axial shrink-back and radial dimensions of 0.375–0.390 inch inside diameter.

Example II

The polyethylene tubing used in this example was substantially the same as that of Example I, except that it was colored black by the inclusion of 1% carbon black in place of the yellow pigment and the dimensions were nominally 20 gauge (0.033–0.037 inch inside diameter; 0.015–0.018 wall thickness). The tubing was processed in the apparatus of FIGURES 1–3, but with the covers 13 and 14 removed. The inside diameter of the plug 31 was 0.063 inch, and the diameter of the surface 36 was 0.125 inch. The temperature was the same as in Example I, but the pressure was about 25 p.s.i.g. and the lineal speed was 50 ft. per minute. The expanded inside diameter was 0.063–0.074 inch and the wall thickness was 0.010–0.013 inch. Of the 2,036 feet on the reel, 1,904 feet were good material, the other 132 feet were outside the given dimensions due to start-up and shut-down of the apparatus. Axial shrinkage of test specimen was less than 5%, but the shrunk-back diameter was virtually the same as that of the initial tubing.

*Example III*

The polyethylene tubing was clear extruded material comprising 99% of the polyethylene of Example I and 1% of the antioxidant. The extruded tubing was irradiated to 40 megarads. The tubing was processed in the closed system of the drawings at a temperature of 275° F., pressure of 3½–3¼ p.s.i.g. and a speed of 25 ft. per minute. The initial inside diameter was 0.260–0.265 inch and the wall thickness was 0.020–0.023 inch. The inside diameter of the plug 31 was 0.310 inch and the diameter of the surface 36 was 0.440 inch. The expanded inside diameter of the tubing was 0.380–0.385 inch and the wall thickness was 0.016–0.019. Out of 2,469 feet, 2,395 feet were within these limits and 74 feet varied above or below by reason of starting and stopping the apparatus. Axial shrinkage of test specimen was less than 6%. The recovered inside diameter of the specimen was 0.265–0.275 inch.

*Example IV*

Expansion of extruded polytetrafluoroethylene tubing (Du Pont Teflon) was conducted in apparatus comprising a 0.401 inch inside diameter glass tube surrounded by a heating coil. A glass cooling tube was axially spaced about ½ inch from the end of the first tube. The glass cooling tube was about 12 inches long, the last 6 inches of the tubing being provided with a glass cooling jacket. The Teflon tubing before expansion was 0.262–0.264 inch inside diameter and the wall thickness was 0.010–0.012 inch. The temperature was 800° F., and a pressure of 8 p.s.i.g. was applied to the inside of the Teflon tube, and the speed was 2 ft. per minute. The Teflon was heated beyond the crystalline melting point of 621° F., as was apparent from the change from the cloudy, crystalline appearance due to light scattering of the spherulitic structure to a clear, amorphous gel. Expansion could be seen taking place after the Teflon passed about 1 inch into the cooling tube, the expansion taking place at the point where the clear gel began to turn back to the cloudy condition. The tubing continued to expand and contacted the wall of the cooling tube in the water-cooled area. The expanded inside diameter of the Teflon was 0.383–0.385 inch and the wall thickness was 0.008–0.010 inch. Re-heated specimens returned virtually to their original radial dimensions with less than 7.5% axial shrink-back.

The temperature used in carrying out the process of the present invention is not critical so long as it is equal to or in excess of the crystalline melting range of the particular material being used, and below the thermal degradation temperature of such material. From a practical standpoint, the temperature used is in excess of the crystalline melting temperature or range in order to make sure that the material has completely passed into the gel or noncrystalline (amorphous) state.

For the purpose of this application, the terms "crystalline melting point" and "crystalline melting temperature" are considered to be synonymous as representing the temperature or temperature range at or within which the crystalline or a cross-linked crystalline polymeric material changes from the crystalline to the amorphous state.

Having fully described our invention, it is to be understood that we do not wish to be limited to the details herein set forth, but our invention is of the full scope of the appended claims.

We claim:
1. A process for the production of heat-shrinkable tubing having a predetermined diameter from an extruded tube of a crystalline polymeric material, said material exhibiting elastomeric properties when heated to a temperature at least equal to its crystalline melting temperature, said process comprising heating said tube to a temperature at least equal to the crystalline melting temperature of said material establishing a pressure differential between the inside and outside of said tube, said pressure differential being less than that required to expand the tube to the final predetermined diameter while it is at said temperature, but being sufficient to expand the tube to the final predetermined diameter upon cooling the tube to a temperature below said crystalline melting temperature, and cooling the tube to a temperature below said crystalline melting temperature while continuing to maintain said pressure differential until said tube is set at the desired predetermined expanded diameter.

2. The process of claim 1 wherein said crystalline polymeric material is produced by cross-linking a crystalline polymer by means equivalent to an irradiation dose of at least about $2 \times 10^6$ rads.

3. The process of claim 1 wherein said crystalline polymeric material is produced by subjecting a crystalline polymer to an irradiation dose of at least about $2 \times 10^6$ rads.

4. The process of claim 3 wherein the crystalline polymeric material is a polyolefin.

5. The process of claim 3 wherein the crystalline polymeric material is polyethylene.

6. The process of claim 1 wherein the crystalline polymeric material is polytetrafluoroethylene.

7. The process of claim 1 wherein the tube is moved through a heating zone, and an expansion and cooling zone, the speeds of travel through said zones being approximately equal so that the length of the tube remains substantially unchanged throughout the process.

8. The process of claim 7 wherein the crystalline polymeric material is irradiated polyethylene.

9. The process of claim 7 wherein the crystalline polymeric material is polytetrafluoroethylene.

10. The process of claim 7 wherein during passage of the tube through the heating zone the pressure externally and internally of the tube is substantially the same.

11. Apparatus for producing dimensionally heat-unstable tubing comprising a pressure vessel having a heating zone, means in said vessel for retaining a supply of tubing, means for conveying a length of tubing from said supply through said heating zone, means for applying heat to said heating zone, means for conveying said tubing exteriorly of said vessel through an opening therein for expansion of said tubing upon emerging from said vessel, means for cooling said expanded tube, means for conveying said tube through said cooling means, and means for applying fluid pressure to the interior of said tube while the tube is conveyed through and out of said vessel and through said cooling means.

12. The apparatus of claim 11 wherein said several conveying means are arranged to convey said tube at substantially the same speed throughout all portions of the apparatus.

13. A process for the production of dimensionally heat-unstable tubing having a predetermined diameter from an extruded tube of a crystalline polymeric material, said material exhibiting elastomeric properties when heated to a temperature at least equal to its crystalline melting temperature, said process comprising heating said tube to a temperature at least equal to the crystalline melting temperature of said material, establishing a pressure differential between the inside and outside of said tube, said pressure differential being less than that required to change the tube to the final predetermined diameter while it is at said temperature, but being sufficient to change the tube to the final predetermined diameter upon cooling the tube to a temperature below said crystalline melting temperature, and cooling the tube to a temperature below said crystalline melting temperature while continuing to maintain said pressure differential until said tube is set at the desired predetermined changed diameter.

References Cited in the file of this patent

UNITED STATES PATENTS

| | | |
|---|---|---|
| 2,337,927 | Reichel et al. | Dec. 28, 1943 |
| 2,494,273 | Wigal | Jan. 10, 1950 |
| 2,931,068 | Kitson et al. | Apr. 5, 1960 |
| 2,952,879 | Kitson et al. | Sept. 20, 1960 |
| 2,987,767 | Berry et al. | June 13, 1961 |

FOREIGN PATENTS

| | | |
|---|---|---|
| 836,542 | Great Britain | June 1, 1960 |

UNITED STATES PATENT OFFICE

CERTIFICATE OF CORRECTION

Patent No. 3,086,242　　　　　　　　　　　　　April 23, 1963

Paul M. Cook et al.

It is hereby certified that error appears in the above numbered patent requiring correction and that the said Letters Patent should read as corrected below.

Column 4, line 50, for "aperture" read -- apertured --; column 6, line 9, after "material" insert a comma.

Signed and sealed this 26th day of November 1963.

(SEAL)
Attest:
ERNEST W. SWIDER

Attesting Officer

EDWIN L. REYNOLDS

Acting Commissioner of Patents